United States Patent [19]

Sato

[11] Patent Number: 4,757,110

[45] Date of Patent: Jul. 12, 1988

[54] THERMOPLASTIC RUBBER COMPOSITIONS

[75] Inventor: Kyosaku Sato, Sarnia, Canada

[73] Assignee: Polysar Limited, Sarnia, Canada

[21] Appl. No.: 22,350

[22] Filed: Mar. 5, 1987

[51] Int. Cl.$^4$ .................. C08L 33/02; C08L 51/04
[52] U.S. Cl. .................................... 525/78; 525/196
[58] Field of Search .................................. 525/78, 196

[56] References Cited

U.S. PATENT DOCUMENTS 3,607,981  9/1971  Morris .................................. 525/234
4,508,867  4/1985  Sato .

Primary Examiner—Jacob Ziegler
Attorney, Agent, or Firm—Stevens, Davis, Miller & Mosher

[57] ABSTRACT

Rubbery thermoplastic blends comprise an acrylonitrile-butadiene-styrene or a styrene-acrylonitrile polymer, a rubbery carboxylated butadiene-acrylonitrile polymer and a metal oxide or hydroxide.

8 Claims, No Drawings

THERMOPLASTIC RUBBER COMPOSITIONS

FIELD OF THE INVENTION

This invention is directed to thermoplastic rubber blends comprising a thermoplastic polymer component, a rubbery carboxylated polymer component and a metal oxide.

BACKGROUND OF THE INVENTION

Acrylonitrile-butadiene-styrene (ABS) is a well known thermoplastic polymer—it can be produced by a variety of methods including two stage polymerization or mixing of an ABS-type polymer known as concentrate with styrene-acrylonitrile (SAN), also a well known thermoplastic polymer. Blends of ABS or SAN with other rubbery polymers, such as polybutadiene, are known as means of altering the thermoplastic properties of the ABS or SAN.

Polyamides (nylon) are well known thermoplastic polymers. Blends of polyamides with rubbery polymers are known as means of altering the thermoplastic properties of the nylon. Blends of nylon, rubbery carboxylated butadiene-acrylonitrile polymer, metal oxide or hydroxide and metal halides are known—see U.S. Pat. No. 4,508,867.

The blending of certain thermoplastic polymers with various rubbery polymers to produce rubbery thermoplastic blends is thus known in the art. The rubbery thermoplastic blends so produced are usually deficient because the rubbery polymer, which is only physically dispersed within the blend, may be extracted or because the blend possesses a less than desired balance of properties due to the fact that the rubbery polymer is present only as a two dimensional network. If the rubbery polymer could be converted to a three dimensional network within the blend, an improved balance of properties would be expected including certain desirably rubbery characteristics not present in the original thermoplastic polymer. In particular, if the three dimensional network of the rubbery polymer had a labile nature and could, during processing of the blend, be at least partially broken and reformed, the blend would further be readily processable and yet have the aforesaid desirable balance of properties.

It is an objective of this invention to provide novel rubbery thermoplastic blends.

SUMMARY OF THE INVENTION

In accordance with the present invention, there are provided novel rubbery thermoplastic blends comprising (i) from about 15 to about 40 parts by weight of a thermoplastic polymer selected from (a) an acrylonitrile-butadiene-styrene polymer containing from about 5 to about 35 weight percent of acrylonitrile, from about 5 to about 25 weight percent of butadiene and from about 45 to about 90 weight percent of styrene and (b) a styrene-acrylonitrile polymer containing from about 60 to about 95 weight percent of styrene and from about 5 to about 40 weight percent of acrylonitrile, (ii) from about 60 to about 85 parts by weight of a rubbery carboxylated butadiene-acrylonitrile polymer containing from about 20 to about 40 weight percent of acrylonitrile, from about 4 to about 10 weight percent of one or more $\alpha,\beta$-unsaturated carboxylic acid selected from acrylic, methacrylic, fumaric, maleic and itaconic acid, the balance to 100 weight percent being butadiene, the total of (i) and (ii) being 100 parts by weight, and (iii) from about 2 to about 8 parts by weight, per 100 parts by weight of (ii), of a metal oxide or hydroxide wherein said metal is selected from magnesium, calcium, zinc and barium.

DESCRIPTION OF THE INVENTION

The thermoplastic polymer of the present invention is selected from ABS and SAN. Suitable ABS may be that made by polymerization or that made by blending a concentrate with SAN. Typically, ABS contains from about 5 to about 35, preferably from about 15 to about 30, weight percent of acrylonitrile, from about 5 to about 25, preferably from about 10 to about 20, weight percent of butadiene and from about 45 to about 90, preferably from about 50 to about 75, weight percent of styrene. In the event that a blend of ABS concentrate with SAN is used, typically the concentrate contains from about 5 to about 20, preferably from about 10 to about 20, weight percent of acrylonitrile, from about 30 to about 55, preferably from about 40 to about 55, weight percent of butadiene and from about 25 to about 65, preferably from about 25 to about 50, weight percent of styrene. SAN typically contains from about 5 to about 40, preferably from about 20 to about 35, weight percent of acrylonitrile and from about 60 to about 95, preferably from about 65 to about 80, weight percent of styrene. ABS and SAN polymers are readily available commercial materials.

The rubbery carboxylated butadiene-acrylonitrile polymer typically contains from about 20 to about 40, preferably from about 20 to about 35, weight percent of acrylonitrile, from about 4 to about 10, preferably from about 5 to about 8, weight percent of an $\alpha,\beta$-unsaturated carboxylic acid selected from acrylic, methacrylic, fumaric, maleic and itaconic acid, the balance to 100 weight percent being butadiene. The polymer typically has a Mooney viscosity (ML 1+4 at 100° C.) of from about 35 to about 80. Such polymers are readily available commercial materials.

The metal oxide or hydroxide is present in the composition, based on 100 parts by weight of the rubbery carboxylated butadiene-acrylonitrile polymer, in the amount of from about 2 to about 8, preferably from about 2 to about 6, parts by weight. The metal of said metal oxide or hydroxide is selected from magnesium, calcium, zinc and barium, with zinc oxide being the most preferred material. Expressed in an alternative way, the amount of metal oxide or hydroxide may be about one mole per mole of carboxyl groups present in the carboxylated butadiene-acrylonitrile polymer.

In the rubbery thermoplastic blends of the present invention, there will be from about 15 to about 40, preferably from about 15 to about 35, parts by weight of the thermoplastic polymer, and from about 60 to about 85, preferably from about 65 to about 85, parts by weight of rubbery carboxylated butadiene-acrylonitrile polymer, for a total of 100 parts by weight of said polymers.

The rubbery thermoplastic blends may be prepared by conventional methods using a mixing device such as a rubber mill or, preferably, an internal mixer. Alternatively, an extruder of suitable configuration may be used. A rubber mill would require to be operated at a temperature of from about 160° to about 200° C., preferably from about 170° to about 190° C. When using an internal mixer, it is preferably preheated to a temperature of from about 160° to about 200° C., preferably from about 170° to about 190° C. In a typical non-limiting example of a suitable process, the thermoplastic polymer is added to an internal mixer and mixed therein preferably for from about 0.5 to about 4 minutes, preferably from about 1 to about 2 minutes, following which the rubbery carboxylated butadiene-acrylonitrile polymer and any antioxidants or processing aids are added and the mixing is continued preferably for from about 3 to about 10 minutes, preferably from about 4 to about 7 minutes, so as to achieve good dispersion of the two polymeric components. Any fillers, pigments, reinforcing agents, plasticizers or other additives may be added with the rubbery polymer or during this mixing cycle. Following completion of this stage of mixing, the metal oxide or hydroxide is added to the mixer and mixing is continued for a further period of from about 3 to about 10 minutes, preferably from about 4 to about 8 minutes, so as to achieve good dispersion of the metal compound throughout the two polymeric components and to allow the metal compound to come into contact with and react with the carboxyl groups of the carboxylated butadiene-acrylonitrile polymer. On completion of the mixing, the so-formed compound is dumped from the mixer and formed into sheets on a heated two roll mill. Such sheets can readily be formed into the desired shapes and configurations by molding at temperatures of about 200° C. Variations of such a process including different times and/or temperatures, different orders of addition of the components, addition of all components initially and the like are contemplated. The actual process of preparing the blends is not critical and the aforesaid description is illustrative only.

The blends may contain antioxidants especially of the type suitable for stabilizing polymers at elevated temperatures. Such antioxidants are well known in the art and include one or more of the substituted phosphites, substituted phenols and the like in amounts of from about 0.5 to about 2.5 weight percent based on the blend. The blends may also contain processing aids, pigments, reinforcing agents, plasticizers and the like.

The reaction of the metal oxide or hydroxide with the carboxyl groups of the carboxylated butadiene-acrylonitrile polymer occurs while the whole is still being subjected to mixing, that is to say, the reaction is a dynamic reaction, and leads to the formation of a three dimensional network within the polymer, the bonds of which are labile and can be at least partially broken and reformed especially at high temperatures such as for molding or extrusion processes.

The rubbery thermoplastic blends of this invention possess a useful balance of properties which makes them suitable for use as molded or extruded products having high strength properties in such end uses as oil resistant seals, gaskets, hoses, roll covers and the like.

The following examples illustrate the invention. The tests used in the blend evaluations are standard ASTM test and all parts are by weight.

EXAMPLE 1

A laboratory scale internal mixer was used to prepare the compositions shown in Table 1. The mixer was preheated to 180° C., the styrene-acrylonitrile polymer was added and mixed for 1.5 to 2 minutes, at which time the carboxylated butadiene-acrylonitrile polymer and the two antioxidants were added. Mixing was continued for 5 minutes, at which time the zinc oxide was added and mixing was continued for a further 5 minutes. At the completion of the mixing cycle, the blend was removed and sheeted out on a 2 roll mill (at room temperature) to form sheets. The sheets were molded into standard test pieces and the necessary samples were stamped out for testing. The styrene-acrylonitrile polymer (SAN) was TYRIL ®860 from Dow and the carboxylated butadiene-acrylonitrile polymer (XNBR) was KRYNAC 221 in powder form from Polysar Limited which contains about 29 weight percent of acrylonitrile and about 7 weight percent of a carboxylic acid monomer. Antioxidant 1 was an aryl phosphite available as POLYGARD ® and Antioxidant 2 was a hindered phenol available as IRGANOX ®1035.

From Table 1, it can be seen that the controls (Experiments 1 and 2) had very low strength properties and necked on extension whereas Experiments 3 to 7 according to the invention had high strength and good elongation.

TABLE 1

|  | Experiment # | | | | | | |
|---|---|---|---|---|---|---|---|
|  | 1 | 2 | 3 | 4 | 5 | 6 | 7 |
| XNBR | 70 | 80 | 65 | 70 | 75 | 80 | 85 |
| SAN | 30 | 20 | 35 | 30 | 25 | 20 | 15 |
| Zinc oxide | — | — | 3.25 | 3.5 | 3.75 | 4 | 4.25 |
| Antioxidant 1 | 0.75 | 0.75 | 0.75 | 0.75 | 0.75 | 0.75 | 0.75 |
| Antioxidant 2 | 0.5 | 0.5 | 0.5 | 0.5 | 0.5 | 0.5 | 0.5 |
| Properties |  |  |  |  |  |  |  |
| Tensile strength kg/cm$^2$ | 76.5* | 27.5* | 183 | 188 | 180.5 | 192 | 165 |
| 100% Modulus kg/cm$^2$ | 83 | 42 | 143 | 123 | 117 | 80 | 60 |
| 300% Modulus kg/cm$^2$ | — | — | — | 172 | 175 | 148 | 131 |
| Elongation % | 120 | 240 | 290 | 370 | 310 | 400 | 410 |
| Hardness |  |  |  |  |  |  |  |
| Shore A | 92 | 79 | 98 | 95 | 92 | 90 | 86 |
| Shore D | 36 | 26 | 52 | 47 | 41 | 39 | 35 |

*Samples necked

EXAMPLE 2

A composition similar to those of Example 1 was prepared using an intermediate laboratory size BANBURY ® internal mixer. The mixing and sample preparation was as in Example 1. The compositions and properties are shown in Table 2.

TABLE 2

|  | Experiment # 8 |
|---|---|
| XNBR | 80 |
| SAN | 20 |
| Zinc oxide | 2.4 |
| Antioxidant 1 | 0.75 |
| Antioxidant 2 | 0.5 |
| Properties |  |
| Tensile strength kg/cm$^2$ | 127.5 |
| 100% Modulus kg/cm$^2$ | 57.1 |
| 300% Modulus kg/cm$^2$ | 118.3 |
| Elongation % | 470 |
| Hardness Shore A | 76 |

EXAMPLE 3

Compositions were prepared by the procedure of Example 1 except that acrylonitrile-butadiene-styrene (ABS) was used instead of SAN. The ABS was ABS 213 from Dow. The compositions and properties are shown in Table 3. Experiments 9 and 10, which are controls, had very low strength properties and necked on extension whereas Experiments 11 and 12 according to the invention had a good balance of strength properties.

TABLE 3

| | Experiment # | | | |
|---|---|---|---|---|
| | 9 | 10 | 11 | 12 |
| XNBR | 80 | 70 | 80 | 70 |
| ABS | 20 | 30 | 20 | 30 |
| Zinc oxide | — | — | 4 | 3.5 |
| Antioxidant 1 | 0.75 | 0.75 | 0.75 | 0.75 |
| Antioxidant 2 | 0.5 | 0.5 | 0.5 | 0.5 |
| Properties | | | | |
| Tensile strength kg/cm$^2$ | 15* | 21* | 190 | 200 |
| 100% Modulus kg/cm$^2$ | 22.5 | 37.5 | 66 | 122.5 |
| 300% Modulus kg/cm$^2$ | 22.5 | 27 | 150 | 190 |
| Elongation % | 700 | 320 | 350 | 300 |
| Hardness | | | | |
| Shore A | 67 | 77 | 80 | 85 |
| Shore D | 20 | 30 | 40 | 45 |

*Samples necked

EXAMPLE 4

Following the procedure of Example 1, the compositions shown in Table 4 were prepared and had the properties shown therein. Experiments 13 and 14 are controls (containing a low level of zinc oxide) and the low strength properties are clearly seen. Experiments 15 to 21 are within the invention and exhibit a significantly improved balance of strength properties.

TABLE 4

| | 13 | 14 | 15 | 16 | 17 | 18 | 19 | 20 | 21 |
|---|---|---|---|---|---|---|---|---|---|
| XNBR | 80 | 80 | 80 | 80 | 80 | 80 | 80 | 80 | 80 |
| SAN | 20 | 20 | 20 | 20 | 20 | 20 | 20 | 20 | 20 |
| Zinc oxide | 0.8 | 1.6 | 2.4 | 4 | 8 | — | — | — | — |
| Magnesium oxide | — | — | — | — | — | 2.15 | — | — | — |
| Calcium oxide | — | — | — | — | — | — | 3.44 | — | — |
| Calcium hydroxide | — | — | — | — | — | — | — | 3 | — |
| Barium oxide | — | — | — | — | — | — | — | — | 6.73 |
| Antioxidant 1 | 0.75 | 0.75 | 0.75 | 0.75 | 0.75 | 0.75 | 0.75 | 0.75 | 0.75 |
| Antioxidant 2 | 0.5 | 0.5 | 0.5 | 0.5 | 0.5 | 0.5 | 0.5 | 0.5 | 0.5 |
| Properties | | | | | | | | | |
| Tensile strength kg/cm$^2$ | 71 | 152 | 212.5 | 262.5 | 287.5 | 165 | 260 | 257.5 | 292.5 |
| 100% Modulus kg/cm$^2$ | 46 | 57 | 75 | 95 | 97.5 | 65 | 77.5 | 75 | 80 |
| 300% Modulus kg/cm$^2$ | 65 | 101 | 145 | 190 | 207.5 | 117.5 | 147.5 | 145 | 160 |
| Elongation % | 710 | 510 | 440 | 420 | 380 | 470 | 500 | 480 | 480 |
| Hardness | | | | | | | | | |
| Shore A | 72 | 82 | 80 | 86 | 86 | 82 | 83 | 81 | 84 |
| Shore D | 28 | 36 | 33 | 40 | 40 | 37 | 35 | 37 | 41 |

What is claimed is:

1. A rubbery thermoplastic blend which comprises (i) from about 15 to about 40 parts by weight of a thermoplastic polymer selected from (a) an acrylonitrile-butadiene-styrene polymer containing from about 5 to about 35 weight percent of acrylonitrile, from about 5 to about 25 weight percent of butadiene and about 45 to about 90 weight percent of styrene and (b) a styrene-acrylonitrile polymer containing from about 60 to about 95 weight percent of styrene and from about 5 to about 40 weight percent of acrylonitrile, (ii) from about 60 to about 85 parts by weight of a rubbery carboxylated butadiene-acrylonitrile polymer having a Mooney viscosity (ML 1+4 at 100° C.) of from about 35 to about 80 and containing from about 20 to about 40 weight percent of acrylonitrile, from about 4 to about 10 weight percent of one or more a,β-unsaturated carboxylic acid selected from acrylic, methacrylic, fumaric, maleic and itaconic acid, the balance to 100 weight percent being butadiene, the total of (i) and (ii) being 100 parts by weight, and (iii) from about 2 to about 8 parts by weight, per 100 parts by weight of (ii), of a metal oxide or hydroxide wherein said metal is selected from magnesium, calcium, zinc and barium.

2. The blend of claim 1 in which the thermoplastic polymer is an acrylonitrile-butadiene-styrene polymer containing from about 15 to about 30 weight percent of acrylonitrile, from about 10 to about 20 weight percent of butadiene and from about 50 to about 75 weight percent of styrene.

3. The blend of claim 1 in which the thermoplastic polymer is a styrene-acrylonitrile polymer containing from about 65 to about 80 weight percent of styrene and from about 20 to about 35 weight percent of acrylonitrile.

4. The blend of claim 1 in which the rubbery carboxylated butadiene-acrylonitrile polymer contains from about 20 to about 35 weight percent of acrylonitrile, from about 5 to about 8 weight percent of α,β-unsaturated carboxylic acid and the balance to 100 weight percent butadiene.

5. The blend of claim 1 wherein the metal oxide or hydroxide is zinc oxide.

6. A blend according to claim 1 made by the process of mixing said thermoplastic polymer at a temperature of from about 160° to about 200° C. with said rubbery carboxylated butadiene-acrylonitrile polymer followed by addition of said metl oxide or hydroxide and continuing the mixing so as to obtain good dispersion of the components.

7. A blend according to claim 1 made by the process of mixing said thermoplastic polymer at a temperature of from about 160° to about 200° C. followed by addition of said rubbery carboxylated butadiene-acrylonitrile polymer and said metal oxide or hydroxide and continuing the mixing so as to obtain good dispersion of the components.

8. A blend according to claim 1 made by the process of adding said thermoplastic polymer, said rubbery carboxylated butadiene-acrylonitrile polymer and said metal oxide or hydroxide to a mixing device at a temperature of from about 160° to about 200° C. and mixing so as to obtain good dispersion of the components.

* * * * *